Patented Jan. 26, 1954

2,667,496

UNITED STATES PATENT OFFICE 2,667,496

ALKENYLATION OF THIOPHENES

Arthur A. Harban, Hammond, and Carl E. Johnson, Griffith, Ind., assignors to Standard Oil Company, Chicago, Ill., a corporation of Indiana No Drawing. Application December 30, 1949, Serial No. 136,164

8 Claims. (Cl. 260—329)

This invention relates to the alkenylation of aromatic heterocyclic compounds having a sulfur atom in the heterocyclic ring. These compounds include thiophene, thiotolene, thioxenes and thionaphthene. The invention relates more particularly to the preparation of monoalkenyl thiophene and monoalkenyl-substituted thiophenes by the catalyzed reaction of a thiophene of the above type with a conjugated diolefinic hydrocarbon.

As is well known, the 5-membered heterocyclic ring constituting thiophene is a relatively stable compound in which the carbon-to-sulfur bonds are the most readily broken. Consequently, catalytic agents which would be effective to introduce a substituent for a hydrogen on the ring tend to decompose the compound and produce hydrogen sulfide and polymers. It is also known that the reactant diolefins, preferably conjugated diolefins, are readily polymerized in the presence of strong catalysts, such, for example, as sulfuric acid.

As disclosed and claimed in the copending application of Becker, Serial No. 135,310, filed December 27, 1949, sulfonic acids, preferably alkanesulfonic acids, can be employed to catalyze this alkenylation reaction in which thienyl alkenes, particularly monoalkenyl thiophenes, are produced, provided that the reaction temperature is maintained below about 0° C.

It is a primary object of the present invention to provide a process of alkenylating thiophene and substituted derivatives thereof at substantially ambient temperatures so that cooling requirements can be greatly reduced. Another object of the invention is the provision of a method for preparing monoalkenyl thiophenes and monoalkenyl-substituted thiophenes. The invention has for further objects such other advantages or results as will appear in the specification or the claims hereinafter made.

Briefly stated, the present invention comprises reacting thiophene or a substituted thiophene with a conjugated diolefin at temperatures between 0° and 80° C., and preferably at temperatures between 5° and 50° C., in the presence of at least 1 percent by weight, based on the thiophene compound, of sulfonic acid-oxonium salt complex catalyst that is stable under reaction conditions and is formed by mixing a sulfonic acid and an aliphatic or cyclic ether having not more than about 12 carbon atoms. Suitable ether compounds are dioxane, alpha-pyrone, tetrahydrofuran, diethyl, dipropyl, and dibutyl ether. Preferably a molar excess of thiophene or thiophene derivative is employed. A molar excess of thiophene does not produce predominantly dithienyl alkanes by reaction with a diolefin as might be expected, but rather the monoalkenyl thiophene is produced in predominant yield. Contact of the diolefin and the catalyst complex before admixture with the thiophene reactant should be avoided to prevent polymerization of the diolefin. Preferably, the thiophene compound and the catalyst are first mixed, and then the diolefin is slowly added to the mixture while cooling the same to remove exothermic heat of reaction. In one alternate method, a mixture of the thiophene compound and the conjugated diolefin can first be prepared and the catalyst complex can be slowly added to the mixture. In another method, a mixture of the thiophene compound and the sulfonic acid-oxonium salt complex is first prepared and then is added to a mixture of the thiophene compound and the diolefin. Although the process can be effectively operated at atmospheric pressure, it is preferred to employ mild superatmospheric pressure, particularly when operating within the upper portion of the range of operating temperatures hereinabove set forth. Superatmospheric pressures are employed to ensure liquid phase reaction, particularly when the diolefin is of low molecular weight, for example, butadiene. The rate of reaction appears to be substantially instantaneous, but it is necessary to add the diolefin slowly enough to avoid developing excessive temperatures. Thus, reaction can be completed within less than, for example, twenty minutes, but, if the cooling capacity is limited, a reaction period of one-half to three hours can be employed.

The employment of the dioxane sulfonic acid complex as the alkenylation catalyst permits not only reaction at practicable and readily controllable temperatures, but also provides a substantial yield of the monoalkenyl thiophenes (thienyl alkenes); it avoids the polymerization of the employed conjugated diolefins, which has heretofore been observed and is to be expected when strong acid condensation agents are to be employed, and also the decomposition or polymerization of the thiophene compound.

The employment of alkane sulfonic acid complexes in which the alkane group has at most five carbon atoms per molecule provides an ease of separation of catalyst from the resulting alkenylated oils inasmuch as these acids are preferentially water-soluble. Thus, it is preferred to employ the addition compounds of dioxane and methane-, ethane-, 1-propane-, 2-propane-, 1-butane-, 2-butane-, 2-methyl-2-propane, or pentane-sulfonic acids or mixtures thereof, e. g., a commercially available mixture of $C_1$—$C_4$ alkanesulfonic acids. There can, however, be employed higher alkanesulfonic acids such as octane-, decane-, dodecane-sulfonic acids and the like. One can also employ aromatic sulfonic acids such as benzene-, toluene-, xylene-, naphthalene-sulfonic acids, and the like. Other sulfonic acids available for use in the practice of our invention are cycloalkyl sulfonic acids, such as cyclohexanesulfonic and methylcyclohexanesulfonic acids and the like. Aralkyl sulfonic acids, such as benzylsulfonic, beta-phenethyl sulfonic acids and the like can also be used.

Diolefins particularly suitable in the present reaction include those conjugated diolefins such, for example, as 1,3-butadiene, isoprene, piperylene, 2,3-dimethylbutadiene, cyclopentadiene, methylcyclopentadienes, 1,3-cyclohexadiene and 2-chloro-1,3-butadiene. As aforementioned, the thiophene compounds can include thiophene, $C_4H_4S$, thiotolene, $C_5H_6S$, the thioxenes, $C_6H_8S$, and thionaphthene, $C_8H_6S$. In the case of the thioxenes, those isomers in which an alpha carbon atom is available to the alkenylation reaction provide better yields and thus are preferred in the process.

Thiophene, the leading member of the heterocyclic series, is found in small quantities in coke oven light oil and can be prepared by reaction at about 600° C. between butane, such as that obtained from the $C_4$ cut from petroleum cracking processes, and sulfur. Butene, butadiene, thiophene, and hydrogen sulfide are the products of this reaction. Butadiene can be produced in varying relative quantities of from about one-half to one mol per mol of thiophene.

Under reaction conditions, about 1 percent of dioxane-sulfonic-acid addition product by weight based on the reactant heterocyclic sulfur compound is required to effect reaction. Amounts of catalyst above 40 percent by weight based on the heterocyclic reactant effect no increase in catalysis and at higher concentrations undesirable side reactions may be encountered. A preferred range of catalyst concentration is from 2 to 20 percent of sulfonic acid-oxonium salt complex by weight, based on the heterocyclic sulfur compound. In spite of the known tendency of strong acid condensation agents to effect polymerization, the above concentrations of the sulfonic acid complexes, either as chemical individuals or as a mixture of complexes of the acids having not more than 5 carbon atoms per molecule, result in substantial production of monoalkenyl thiophenes.

The following example will illustrate the process of invention.

The oxonium salt complex of a mixed alkane sulfonic acid and dioxane was formed by mixing 0.47 mol of the mixed acids, which contained methane-, ethane-, propane-, and a small amount of butanesulfonic acid with 0.47 mol of paradioxane. An addition product formed with evolution of heat.

The so-formed dioxane alkane sulfonic acid catalyst was added to 252.3 grams of thiophene. Isoprene was then slowly added to thiophene catalyst until a total of 68.1 grams of the diolefin was consumed. The temperature was maintained between 25° and 30° C. Thienyl pentene in a yield of 49 percent of the theoretical yield was obtained. The so-produced thienyl pentene (boiling point 121° C. at 60 mm. Hg; $n_D^{20}$ 1.5255) was found to have a molecular weight of 152 by mass spectrometric analysis corresponding to 152, the calculated molecular weight of monomeric pentenyl thiophene. The mass spectrum observation provided no evidence to indicate the presence of compounds of any other molecular weight in the separated product.

As illustrated in the foregoing specific example, at least one mol of ether per mol of sulfonic acid is employed in forming the ether-sulfonic acid complex, or addition product. The mol ratio of at least 1:1 is required to avoid the presence of any free sulfonic acid in the so-produced catalyst. An excess of ether can be used and preferably a mol ratio of ether to sulfonic acid of from 1.2 mols/mol to 1 mol/mol is effectively employable in the formation of the catalyst. The catalyst is formed by mixing the components, either one of which can be added to the other. In either case the heat of formation should be removed to an adequate degree to prevent excessive heating.

The thienyl alkenes are useful in the preparation of copolymers, in esterification processes and as organic intermediates.

We claim:

1. The process of preparing thienyl alkenes that comprises reacting thiophene and a conjugated diolefin at a temperature between about 0° and 80° C. in the presence of at least 1 percent by weight based on the thiophene of a non-olefinic hydrocarbon sulfonic acid-oxonium salt complex catalyst that is stable under reaction conditions and is formed by mixing a saturated ether having not more than 12 carbon atoms and a non-olefinic hydrocarbon sulfonic acid.

2. The process of alkenylating a thiophene compound having an available hydrogen-substituted alpha carbon atom that comprises admixing a said thiophene compound, a conjugated diolefinic hydrocarbon, and at least about 1 percent, by weight based on the thiophene compound, of a catalyst that is a dioxane-alkanesulfonic acid addition product, maintaining the thiophene and diolefin at a temperature between 0° and 80° C. and effecting reaction therebetween.

3. The process of preparing thienyl alkenes comprising passing a conjugated diolefinic hydrocarbon into a molar excess of thiophene containing between 2 and 40 percent by weight, based on the thiophene, of catalyst consisting of a dioxane-alkanesulfonic acid addition product of which the acid has not more than 5 carbon atoms per molecule at a temperature between about 10° C. and about 50° C. for a period of time sufficient to effect substantial completion of reaction between thiophene compound and diolefin, separating liquid product from the catalyst, and recovering a thienyl alkene from the product.

4. The process of claim 3 in which the conjugated diolefinic hydrocarbon is butadiene.

5. The process of claim 3 in which the conjugated diolefinic hydrocarbon is isoprene.

6. A process of alkenylating a thiophene compound having an available hydrogen-substituted alpha carbon atom that comprises admixing a said thiophene compound and a conjugated diolefinic hydrocarbon at a temperature between about 0° and 80° C. in the presence of at least about 1% by weight based on the thiophene compound of a non-olefinic hydrocarbon sulfonic acid-oxonium salt complex catalyst that is stable under reaction conditions and is formed by mixing a saturated ether having not more than 12 carbon atoms and a non-olefinic hydrocarbon sulfonic acid.

7. The process of claim 6 in which the conjugated diolefinic hydrocarbon is butadiene.

8. The process of claim 6 in which the conjugated diolefinic hydrocarbon is isoprene.

ARTHUR A. HARBAN.
CARL E. JOHNSON.

References Cited in the file of this patent
UNITED STATES PATENTS

| Number | Name | Date |
|---|---|---|
| 2,141,611 | Malishev | Dec. 27, 1938 |
| 2,396,144 | Anderson | Mar. 5, 1946 |
| 2,462,793 | Lee | Feb. 22, 1949 |